(12) United States Patent
Kahn et al.

(10) Patent No.: US 11,372,979 B2
(45) Date of Patent: Jun. 28, 2022

(54) COMPUTING DEVICE LOGIN FAILSAFE

(71) Applicant: HEWLETT PACKARD ENTERPRISE DEVELOPMENT LP, Houston, TX (US)

(72) Inventors: Mohamed Kahn, Roseville, CA (US); Shaun Wakumoto, Roseville, CA (US); Ted T. Nguyen, Antelope, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 392 days.

(21) Appl. No.: 16/717,158

(22) Filed: Dec. 17, 2019

(65) Prior Publication Data

US 2021/0182399 A1 Jun. 17, 2021

(51) Int. Cl.
*G06F 21/57* (2013.01)
*G06F 9/4401* (2018.01)
(Continued)

(52) U.S. Cl.
CPC .......... *G06F 21/575* (2013.01); *G06F 9/4408* (2013.01); *G06F 21/31* (2013.01); *G06F 21/46* (2013.01)

(58) Field of Classification Search
CPC ...... G06F 21/575; G06F 9/4408; G06F 21/31; G06F 21/46
See application file for complete search history.

(56) References Cited

U.S. PATENT DOCUMENTS 5,963,142 A * 10/1999 Zinsky ................. G06F 12/1433 726/19
6,145,085 A * 11/2000 Tran ......................... G06F 21/31 726/5

(Continued)

FOREIGN PATENT DOCUMENTS

CN 105205401 10/2017

OTHER PUBLICATIONS

Blakstad, J.W. and Nergård, R.W., 2009. Procedures and Tools to Reset or Recover the Administrator Password on Popular Operating Systems (Master's thesis, Instituttfortelematikk). (Year: 2009).*

(Continued)

*Primary Examiner* — James R Turchen
(74) *Attorney, Agent, or Firm* — Nolte Intellectual Property Law Group

(57) ABSTRACT

A method for accessing a computing device including launching a first operating system having a bootloader to boot a second operating system into a random-access memory on the computing device, the first operating system and the second operating system having access to an administrator password contained in an administrator password file located in a persistent file of the computing device and booting the second operating system from the first operating system bootloader to populate a filesystem into the second operating system. Also, executing a login failsafe by the second operating system to read the administrator password contained in the administrator password file located in the persistent file and installing the administrator password file in the filesystem of the second operating system by the login failsafe. The method further including failing to complete the booting of the second operating system and allowing access to the computing device through an administrator user account protected by the administrator password when the second operating system fails to complete the booting.

20 Claims, 7 Drawing Sheets

(51) Int. Cl.
    *G06F 21/31*     (2013.01)
    *G06F 21/46*     (2013.01)

(56) References Cited

U.S. PATENT DOCUMENTS

| | | | |
|---|---|---|---|
| 6,766,510 B2* | 7/2004 | Takeda | G06F 11/3664 |
| | | | 714/E11.21 |
| 6,862,681 B2 | 3/2005 | Cheston et al. | |
| 9,098,448 B2* | 8/2015 | Barajas | G06F 11/1417 |
| 9,465,643 B1* | 10/2016 | Andrews | G06F 9/45558 |
| 10,402,290 B2* | 9/2019 | Tumkur | G06F 11/2294 |
| 2014/0351569 A1* | 11/2014 | Durand | G06F 8/65 |
| | | | 713/1 |
| 2016/0371163 A1* | 12/2016 | Swierk | G06F 11/2284 |
| 2017/0315818 A1 | 11/2017 | Shivanna et al. | |

OTHER PUBLICATIONS

Pietroforte, Michael; Forgot the administrator password? The Sticky Keys trick; https://4sysops.com/archives/forgot-the-administrator-password-the-sticky-keys-trick/; Aug. 12, 2010 (Year: 2010).*

Polk, Jack; How do I crack admin password during dual boot Windows 10 with Linux?; https://www.quora.com/How-do-I-crack-admin-password-during-dual-boot-Windows-10-with-Linux, Jul. 3, 2016 (Year: 2016).*

Offline Windows Password & Registry Editor, Bootdisk / CD; pogostick.net/~pnh/ntpasswd/; Feb. 1, 2014; (Year: 2014).*

Problem Determination and Service Guide, (Technical Paper), Sep. 2012, 42 Pgs.

* cited by examiner

COMPUTING DEVICE LOGIN FAILSAFE

BACKGROUND

The rapid growth of computer network technology has resulted, generally, in network security becoming a greater concern for individuals and businesses. To protect computing devices from access by unauthorized users, user accounts linked to specific passwords may be used. As such, unauthorized users may not access a protected user account for which they do not have the password. While user accounts may prevent unauthorized users from accessing computing devices, in certain circumstances, the user accounts on the computing devices may become unavailable. In such a circumstance, authorized users may not be able to access the computing device.

DETAILED DESCRIPTION

Figure 1:
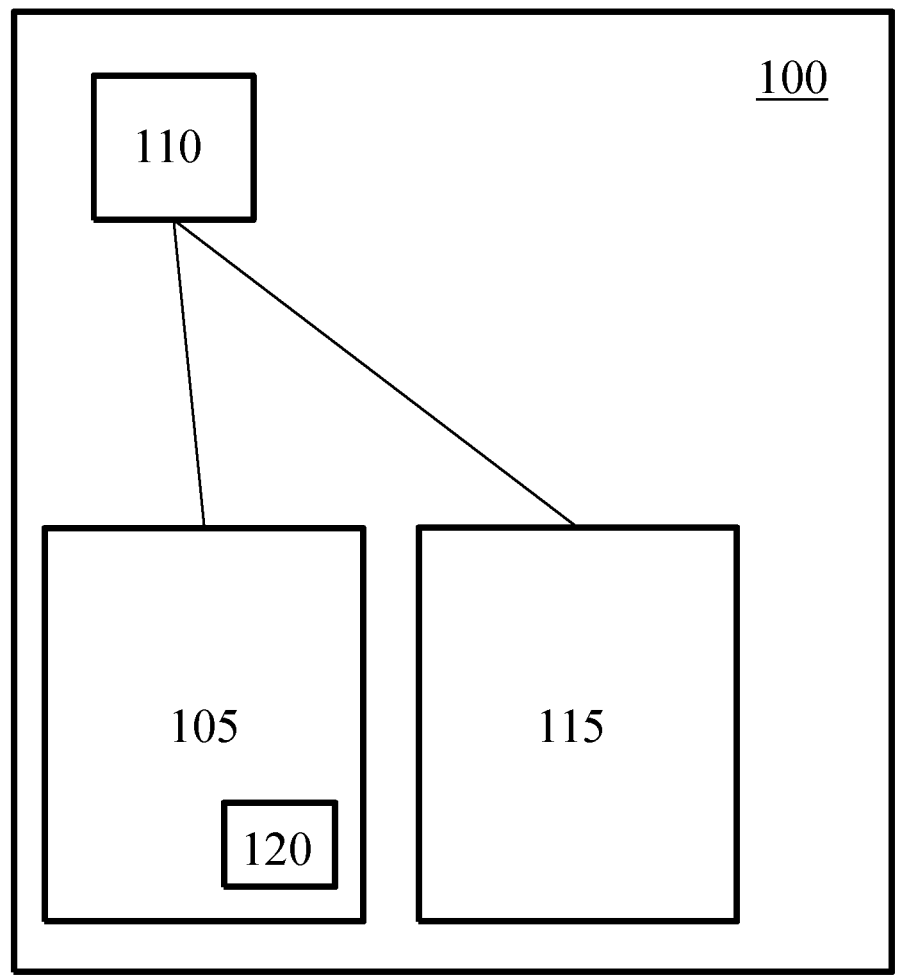
FIG. 1 is a schematic representation of a computing device, according to one or more examples of the present disclosure.

One or more examples are described in detail with reference to the accompanying figures. For consistency, like elements in the various figures are denoted by like reference numerals. In the following detailed description, specific details are set forth in order to provide a thorough understanding of the subject matter claimed below. In other instances, well-known features to one of ordinary skill in the art having the benefit of this disclosure are not described to avoid obscuring the description of the claimed subject matter.

Computing devices are electronic devices that take inputs, process the inputs, then determine results from the inputs. Examples of computing devices may include general purpose computers, servers, switches, routers, and the like. Computing devices may include various types of computing instructions, for example, basic input/output system ("BIOS") instructions, operating systems, network services, application services, applications, and other programs and operating information that is usable by computing devices.

Computing devices may include information that authorized users are allowed to access, but unauthorized users are prevented from accessing. As explained above, to prevent access to computing devices, user accounts with associated passwords may be used to prevent an unauthorized user from accessing specific computing devices. The user account and user password may be stored in a file in the memory of the computing device or on another computing device linked thereto. When the user attempts to access the computing device, the user may be prompted with a user account login screen prompting the user to input a password in order to access the device. When the user enters the correct password, the user may gain access to the computing device. In contrast, an incorrect password may result in the user not being allowed to access the computing device.

Computing devices may include user configuration files, in which the user account and associated passwords may be stored. In certain computing devices, when the device is restarted, such as being rebooted, the device is reset to a clean state so that the user configuration files are not present on the device. As the device reboots, the user configuration files are applied from a collection of stored user configuration files, which include a record of the user accounts and user account passwords. When the user configuration files are applied, the user accounts and user account passwords are accessible by the computing device. However, before the user configuration files are applied, the user accounts and associated user account passwords are not accessible by the computing device.

As the computing device reboots, there are various system processes that may occur prior to the user configuration files being applied. For example, in certain circumstances a computing device may load a BIOS, bootloader, core operating system services, network services, application services, etc. As these operations load, should a failure occur, aspects of the computing device may be affected. For example, if the user configuration, the network services, the application services, or other services and/or applications are corrupted, the user configuration may not be applied to the computing device. Similarly, should certain hardware malfunction, aspects of the computing device may not be available. In such situations, the user account information may not be applied, and the computing device may not be accessible by a user.

In certain circumstances computing devices may run a first operating system that includes a bootloader to boot a second operating system. In such computing devices, the computing devices may be effectively reset to a clean state on each boot, as the filesystem of the second operating system is not stored in persistent memory. As such, each boot of the computing device results in the second operating system being effectively reinstalled to restore the associated filesystem. In certain instances, reinstalling the filesystem may include reloading user accounts and associated user account passwords. During booting of the second operating system, a failure in the boot process may occur prior to the user accounts and associated user account passwords being loaded.

Such circumstances may be referred to as a user lockout. Because the user is locked out of the computing device, the computing device is not accessible and may be difficult to troubleshoot. In certain instances when a user is locked out, troubleshooting may not be possible, and the computing device may have to be replaced. Such trouble shooting and device replacement may be time consuming, result in device downtime, be labor intensive, and/or expensive.

Methods and systems disclosed herein may provide options so that should a system failure in a computing device occur, the device may still be accessed by a user. In certain implementations, the computing device may include an administrator password file that is stored in the persistent memory of the computing device. The administrator password file may include an administrator file. During the boot process for the second operating system, a login failsafe module may run that reads the administrator password from the administrator password file stored in persistent memory and install the administrator password file in the filesystem of the second operating system. The login failsafe may occur early in the boot process, such that a system failure that occurs after the login failsafe may not result in a user lockout. For example, the login failsafe may run before or during loading of core operating system services, earlier than user accounts and account passwords are loaded into the file system of the second operating system. As such, where failing to load user accounts and passwords that occur later in the process could prevent access to the second operating system and/or computing device, the administrator account and associated passwords may still provide access to the second operating system and the computing device even if the specific user accounts fail to load properly.

Because the user has access to the computing device, the user may run diagnostics in order to determine the cause of the system failure and/or user lockout. As such, the user may have the option to remediate the cause of the problem without lengthy trouble shooting and/or device replacement.

Additionally, computing devices that use a first operating system to boot a second operating system do not share certain file directories. Because certain file directories are not shared, user accounts are not shared between the first and second operating systems so when a boot process of the second operating system fails, a user lockout may result. Furthermore, the first operating system does not read or write to the second operating system configuration files. As such, changing an administrator password in the first operating system only affects the next boot of the second operating system and changing the password in the second operating system has no effect on the first operating system. Implementations of the present disclosure allow for the first operating system and the second operating system to share an administrator password that may be changed within either operating system. As such, during a booting process of the second operating system a user may have access to the second operating system even if a failure in the boot process occurs. Computing devices having a login failsafe and methods of accessing such computing devices are discussed in detail below.

Turning to FIG. 1, a schematic representation of a computing device according to one or more examples of the present disclosure is shown. In this example, computing device 100 includes a persistent memory 105 and a processing resource 110 that is capable of executing instructions stored in persistent memory 105. Computing device 100 may further include other types of memory 115, such as, for example, random-access memory. During operation, data may be read or written to persistent memory 105 and/or memory 115 by processing resource 110. In one example, computing device 100 may be a switch; however, in other examples, computing device may be any device that has memory 105/115 and processing resource 110.

As briefly discussed above, in certain implementations, during reboot of computing device 100 an operating system used to run computing device 100 may not be stored in persistent memory 105. As such, the filesystem of the operating system is populated into memory 115, such as random-access memory, during each reboot. Populating the filesystem for the operating system may include loading various operating system services, applications, network services, user accounts, passwords, and the like.

In certain implementations, in order to load the operating system into memory 110 after a reboot, another operating system that includes an independent bootloader may be used. For purposes of this discussion, the operating system that includes the independent bootloader is referred to as a first operating system, while the operating system being loaded after the reboot is referred to as the second operating system. In such dual boot configurations, the first operating system may act as a standalone bootloader and recovery operating system for computing devices running a second operating system When a reboot occurs, the first operating system implements code in the form of a bootloader that contains instructions to boot the second operating system into the memory 110 of computing device 100.

While booting the second operating system, the filesystem for the second operating system is loaded into memory 115 and various services and applications may be started. As briefly discussed above, when the second operating system is loaded into memory 115 errors may occur that may result in the second operating system, aspects of the second operating system, and/or computing device 100 becoming unavailable or inaccessible. For example, if an error occurs during the boot process before user accounts and passwords are loaded into memory 115, the second operating system may become inaccessible because the user has no method for logging into the operating system.

Implementations of the present application include a login failsafe module that executes early in the loading of the second operating system to allow access to the second operating system when a failure in the boot process occurs. The login failsafe module may include a process that runs in the second operating system that reads an administrator password from an administrator password file 120 that is stored in memory 105. The administrator password may allow access to an administrator user account of the second operating system. As such, when the second operating system fails to boot to completion, the second operating system may still be accessed through the administrator user account using the administrator password. In other implementations, the administrator password may be used to access other accounts, such as user accounts, application accounts, and the like to access the second operating system and/or other aspects of computing device 100.

While the login failsafe module may provide the second operating system access to the administrator password stored in memory 105, the first operating system may also have access to the administrator password stored in memory 105. For example, in certain implementations a user, such as an administrator, may access the administrator password through the first operating system, while in other implementations a user may access the administrator password through the second operating system. Users may access the administrator password in order to change the password thereby allowing or restricting access to select users. The process to change the password in either the first or second operating system is discussed in detail below with resect to FIG. 3.

In certain implementations, the administrator user account may be a type of user account that is not removable from computing device 100. As such, regardless of the state of computing device 100, the administrator user account may allow a user to access at least certain aspects of computing device 100 and/or the first and second operating systems.

Figure 2:
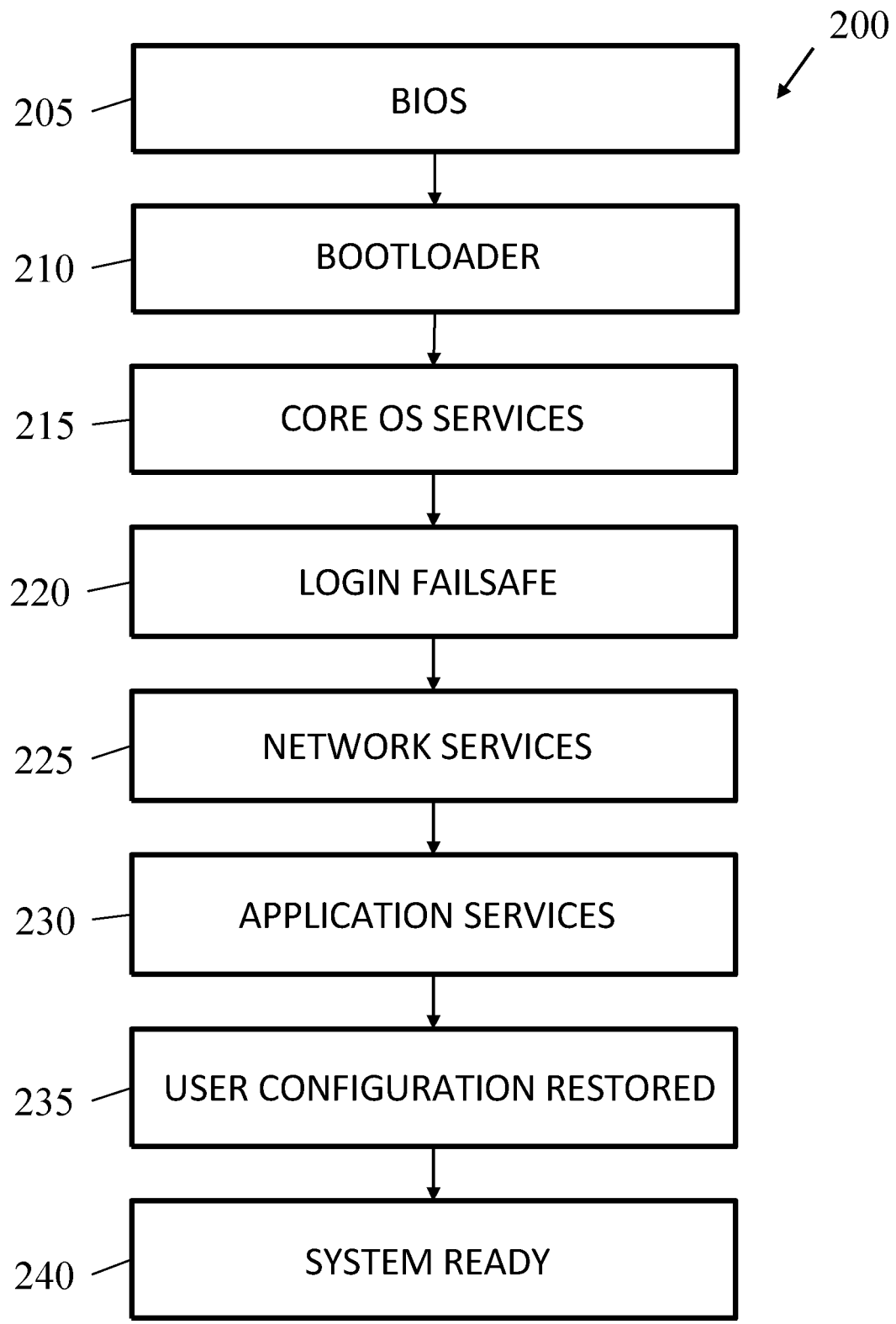
FIG. 2 is a flowchart depicting a method for booting a computing device, according to one or more examples of the present disclosure.

Referring to FIG. 2, a flowchart depicting a method 200 for booting a computing device according to one or more examples of the present disclosure is shown. When computing devices are booted and/or rebooted, a boot sequence may be performed wherein certain aspects of a computing device are initiated in a certain order. Depending on the computing device, operating systems, software applications, and the like, the boot sequence may vary. However, methods disclosed herein, such as method 200, may provide a login failsafe that initiates early enough in the process to allow a user to access the computing device even if the computing devices fails to boot to completion.

In operation, a computing device may load a BIOS (block 205). BIOS is a set of computer instructions in firmware that control input and output operations. The BIOS may be used to perform hardware initialization during the boot process. The BIOS may also provide runtime services for operating systems and programs.

The computing device may also load a bootloader (block 210). The bootloader may be loaded by the BIOS after the BIOS has initialized a portion of the computing devices' hardware. The bootloader may be used to load an operating system from a computing device memory in order to establish an environment in which an operating system can run. In certain implementations, a bootloader of a first operating system may be used to initialize a second operating system.

In operation, the bootloader may allow the second operating system to be started, thereby starting core operating system services (block 215). Core operating system services may include, but are not limited to, an operating system kernel, process management, thread management, memory management, basic drivers, and the like.

The computing device may then make available the login failsafe (block 220). In certain implementations, the login failsafe may load contemporaneously with certain core operating system components, while in other implementations, the login failsafe may load before or after certain core operating system components. At this point, a user may be able to log into a user account in order to access the computing device. As briefly explained above, a specific user account, such as an administrator account, may be present on the computing device. Login failsafe may thus populate the user account password for the specific user account, thereby allowing a user having the password to log into the computing device through both of the first and second operating system. How the login failsafe is used when the computing device fails to boot to completion will be discussed in detail below.

The computing device may then start network services (block 225). Network services may refer to an application running at the network application layer and above that provides data storage manipulation, presentation, communication, and/or other capabilities. Accordingly, the network services may provide applications that allow the computing device to communicate with other devices in a network.

The computing device may then start application services (block 230). Application services may refer to one or more services, such as, for example, load balancing, application performance monitoring, application acceleration, autoscaling, micro-segmentation, service proxy, service discovery, and other services that may occur for a particular implementation. The application services may then be managed, allowing for the application services to be configured, monitored, optimized, and orchestrated.

The computing device may then restore a user configuration (block 235). User configuration may include the specific setup for computing device are provided or allowed by one or more users. The user configuration may thus define the operating environment for the computing device. The user configuration may further include specific applications or services that are setup or otherwise used by a particular user. After the user configuration is restored, the computing device may be in a system ready (block 240) condition, thereby allowing a user to interact with and use the computing device for a particular purpose During operation, the computing device may boot according to the process explained above. However, in other implementations certain aspects may be excluded, while in other implementations, additional aspects may be included. While different computing devices, operating systems, application, etc., may have different boot processes, the login failsafe described herein may be applicable across various computing devices, operating systems, applications, etc.

In operation, at a point during the boot sequence, a computing device may fail to completely boot. For example, a system error may occur during the boot sequence that prevents the computing device from boot completion. Generally, system errors may occur prior to the restoral of user configuration. As such, the computing device may fail to boot, leaving a user without the ability to access any information on or about the computing device. When such an error occurs, a user may be locked out of the computing device and the options available may be limited to lengthy troubleshooting and/or replacement of the computing device or components of the computing device.

In order to prevent a user from being locked out of a computing device, the login failsafe is available early in the boot process, before user configuration is restored. Because the login failsafe is available early in the boot process, there is less likelihood of a system failure occurring that would prevent a user from being locked out of the computing device. For example, if a system error occurred when network services, application services, or user configuration occurs, the user would be able to reboot the computing device and access login failsafe, thereby gaining access to computing device. In certain implementations, a reboot may not occur, as the user may have access to the computing device. In either instance, the user may then run diagnostics on the computing device to determine what caused the system failure. Instead of the length troubleshooting that occurs during a user lockout, a user may be able to access information that allows the user to remediate the problem.

Figure 3:
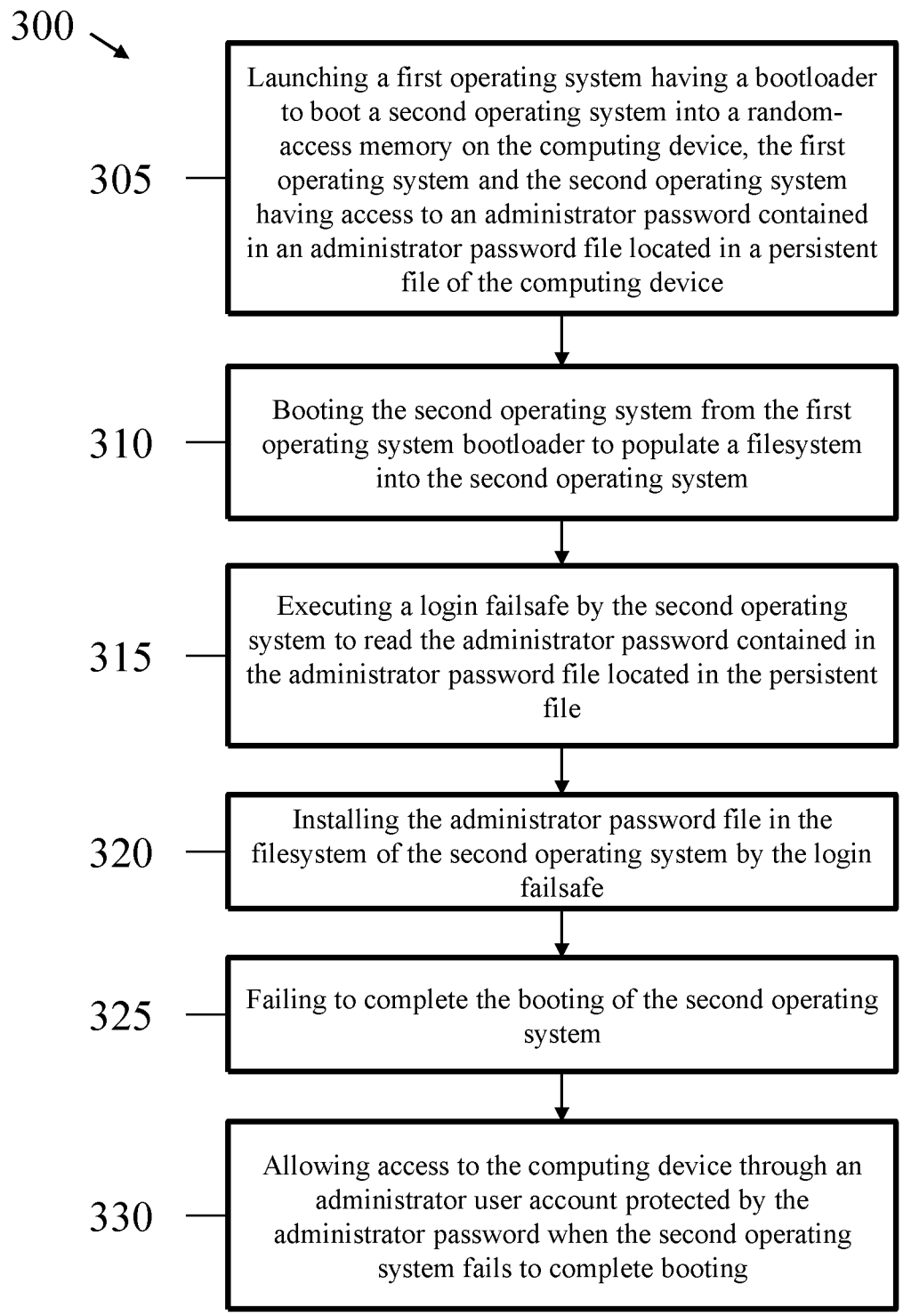
FIG. 3 is a flowchart depicting a method for accessing a computing device, according to one or more examples of the present disclosure.

Referring to FIG. 3, a flowchart depicting a method 300 for accessing a computing device according to one or more examples of the present disclosure is shown. In this example, method 300 may include launching (block 305) a first operating system having a bootloader into a random-access memory on a computing device. The first operating system and the second operating system both have access to an administrator password that is contained in an administrator password file that is located in a persistent file of the computing device. As discussed above, the filesystem of the second operating system may not be persistent in the memory of the computing device. As such, the filesystem may be populated into the random-access memory during each boot.

In operation, method 300 may further include booting (block 310) the second operating system from the first operating system bootloader to populate a filesystem into the second operating system. Booting the second operating system may include restoring or otherwise copying configuration files for the computing device that includes a collection of configuration values. The configuration values may include records of users, user passwords, or other information that may be used to authenticate users of the second operating system and/or the computing device in general. In certain implementations, the configuration values may include values that allow customers or specific third parties access to the second operating system and thus the ability to operate and/or otherwise use the computing device.

In operation, method 300 may further include executing (block 315) a login failsafe by the second operating system to read the administrator password contained in the administrator password file located in the persistent file. The login failsafe may be executed early in the boot process of the second operating system, such as before or during the loading of core services of the second operating system. In certain implementations, the login failsafe may be configured to execute during each booting or rebooting of the computing device, thereby reading the administrator password regardless as to the condition of first operating system, second operating system, and/or other aspects of the computing device.

In operation, method 300 may further include installing (block 320) the administrator password file in the filesystem of the second operating system by the login failsafe. Installation of the administrator password file may thereby allow an administrative user to login to the computing device wherever a login prompt is presented. In certain implementations, if a login prompt does not occur, the administrative user may force the login prompt to be presented. The administrative user may include an operator of first operating system, second operating system, an owner of computing device, a customer of computing device, or anyone with administrative rights to access aspects of the software and hardware of the computing device. As the login failsafe installs the administrator password file into the filesystem of the second operating system, should the second operating system fail to install certain files, including other user accounts and associated login credentials, the computing device may still be accessed by an administrative user or any party with administrative user credentials.

In operation, the administrator password may be changed to adjust security, restrict users, or otherwise to modify access credentials of certain individuals. The administrator password may be set in either the first operating system or the second operating system. As such, a user may access the first operating system and change the administrator password. Because both the first operating system and the second operating system have access to the same administrator password file, a change to the administrator password file by the first operating system may be loaded into and honored by the second operating system. Similarly, a user may access the second operating system and change the administrator password. However, in certain implementations, a change to the administrator password in the second operating system may take effect when the change is written to the startup configuration records for the computing device. The startup configuration records may include records in the configuration database for the computing device that determines a running configuration for the computing device during reboots. If changes to the administrator password are not written to the startup configuration records, the change to the password may not take effect such that on a subsequent reboot the original administrator password would be installed into the filesystem of the second operating system rather than the modified administrator password.

In certain implementations, after the login failsafe installs the administrator password file in the filesystem of the second operating system, a management daemon may copy existing user records from the startup configuration to an in-memory database of the second operating system. The administrator password in the database may not match the administrator password contained within the administrator password file because the startup configuration may not contain an administrator password that was set by the first operating system on that particular boot. As such, management daemon may update the administrator password in the database to contain the same administrator password in the administrator password file. During each boot, the administrator password in the database may be updated to match the administrator password in the administrator password file. In certain implementations, management daemon may log a notification of update to the administrator password to indicate that the administrator password was changed within the first operating system. In view of the above, the administrator password that is within the administrator password file supersedes an administrator password in the startup configuration if the two passwords are different.

The management daemon may further monitor for changes to the startup configuration and when the startup configuration is rewritten update the administrator password so the administrator passwords for the first operating system and the second operating system are the same.

In certain implementations, the administrator password file may not be found during the booting of the second operating system. In such a situation, the login failsafe may determine that this is the first time the second operating system is being booted and set the administrator password to match a default administrator password that the management daemon sets during the booting of the second operating system. This situation may also occur in instances where the startup configuration has not been previously saved, so no administrator password file is found by the login failsafe during booting the second operating system.

In other implementations, an administrator password file may be found by the login failsafe, but the file may be determined to be corrupted or otherwise inaccessible. In such an implementation, the login failsafe may take no further action, thereby allowing the management daemon to reconstruct the administrator password file from the contents of the database, as discussed above. If the computing system becomes inaccessible before the management daemon reconstructs the administrator password file, a user may reboot the first operating system. Upon rebooting the first operating system the user may then remediate the problem by enabling a one-time use administrator password, thereby allowing the user to set a new administrator password that is accessible by the login failsafe during a subsequent boot of the second operating system.

In operation, method may further include failing (325) to compete the booting of the second operating system. The second operating system may fail to boot to completion for a variety of reasons such as corrupted software, hardware, incomplete file systems, issues with operating system services, network services, application services, user configurations, and the like.

When a failure to complete the second operating system occurs, method 300 may include allowing (330) access to the computing device through an administrator user account that is protected by the administrator password. As explained above, the first and second operating systems share the same administrator password stored in the administrator password file. As such, when a failure to complete booting of the second operating system occurs, the login failsafe may provide an administrator password for the that allows administrative access to the computing device. The user may then access computing system components and files to determine the cause of the failure to boot the second operating system. As such, the diagnostics may be performed on the computing device rather than performing diagnostics on other aspects of the network in an attempt to determine what caused the system failure, thereby resulting in faster diagnostic. The administrator user account may be accessible through either the first or second operating system. As such, in one implementation, access may be allowed to the computing device through the second operating system through an administrator user account protected by the administrator password. In another implementation, access may be allowed to the computing device through the first operating system through the administrator user account protected by the administrator password.

After a problem is found that caused the second operating system to fail to boot, the problem may be remediated. Remediation of the problem may include, for example, fixing a file structure, replacing a hardware component, replacing or modifying a software application, fixing a network service, fixing an application service, fixing a user configuration, and the like. The remediation may further include replacing aspects of the BIOS, the first operating system, and/or the second operating system.

During operation, the administrator user account and/or administrator password may be protected, thereby preventing unauthorized users from accessing the computing device through the login failsafe. In certain implementations, the administrator password may include encryption. To further increase security of the computing device, access to the administrative password in the login failsafe may be restricted. For example, only a customer using computing device may have access to the administrator password. Accordingly, the customer may authorize access to the computing device by a third party by providing the administrator password for the computing device. The third party may then access the computing device to run diagnostics and/or remediate a problem that caused a system failure and/or lockout.

Figure 4:
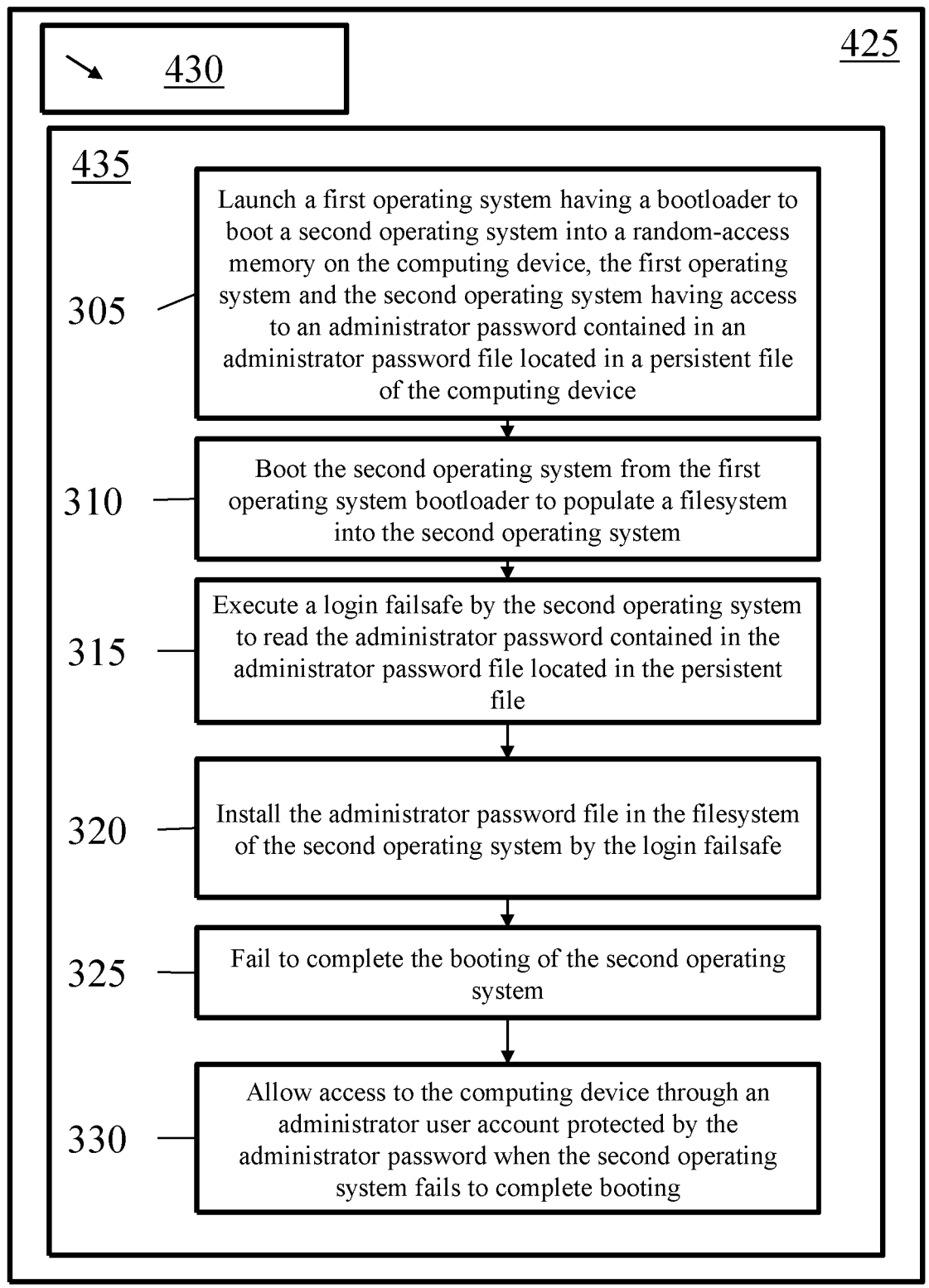
FIG. 4 is an example computing device with a hardware processor and accessible machine-readable instructions, according to one or more examples of the present disclosure.

Turning to FIG. 4, an example computing device with a hardware processor and accessible machine-readable instructions is shown in accordance with one or more examples of the present disclosure. FIG. 4 provides an example computing device 425, with a hardware processor 430, and accessible machine-readable instructions stored on a machine-readable medium 435 for managing data as discussed above with respect to one or more disclosed example implementations. FIG. 4 illustrates computing device 425 configured to perform the method 300 disclosed in blocks 305, 310, 315, 320, 325, and 330 and discussed in detail with respect to FIG. 3. However, computing device 425 may also be configured to perform the other methods, techniques, functions, or processes described in this disclosure.

A machine-readable storage medium, such as 435 of FIG. 4, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 5:
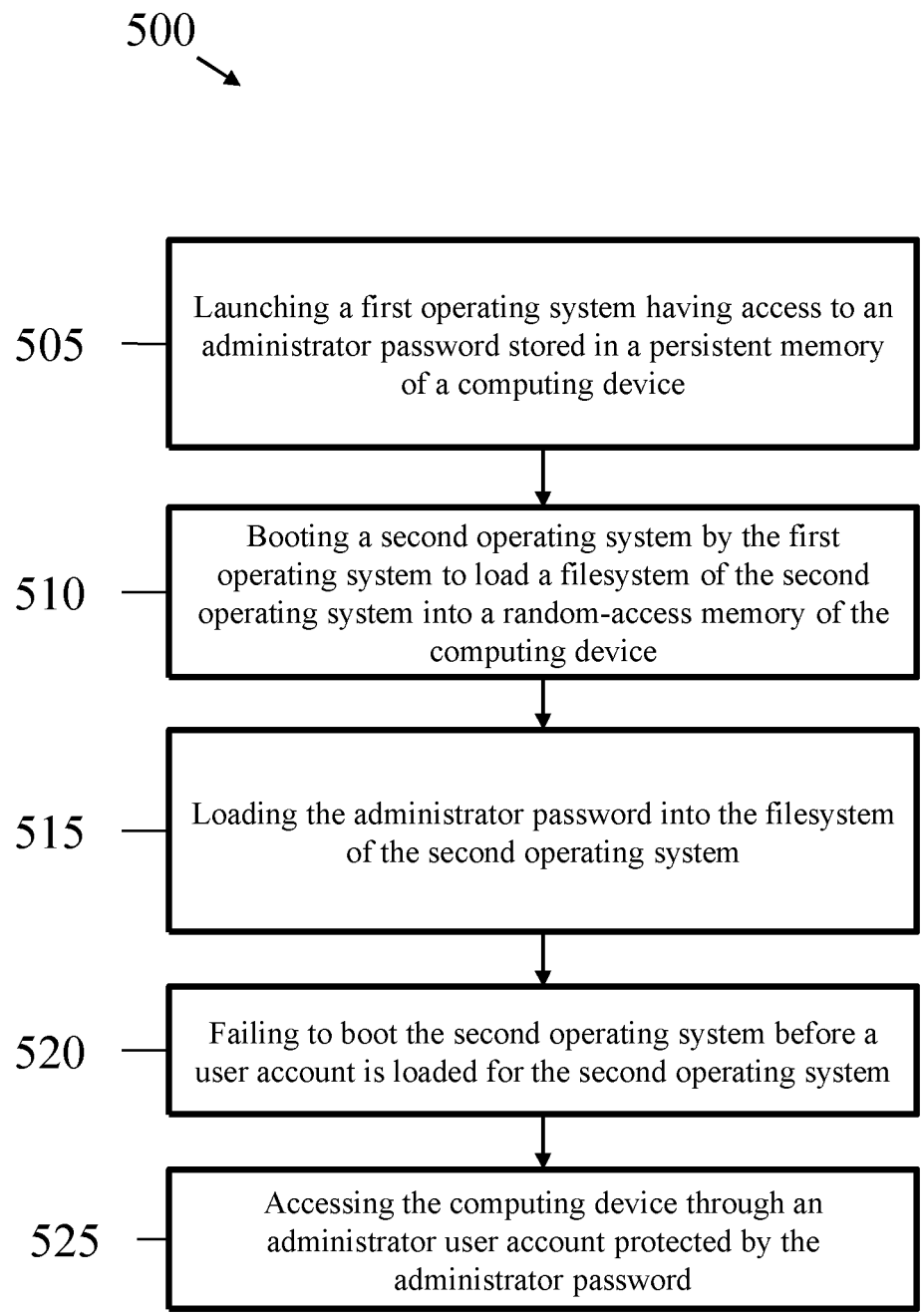
FIG. 5 is a flowchart depicting a method for accessing a computing device, according to one or more examples of the present disclosure.

Turning to FIG. 5, a flowchart depicting a method 500 for accessing a computing device according to one or more examples of the present disclosure is shown. In operation, method 500 may include launching (block 505) a first operating system having access to an administrator password stored in a persistent memory of a computing device.

In operation, method 500 may further include booting (block 510) a second operating system by the first operating system to load a filesystem of the second operating system into a random-access memory of the computing device. In certain implementations, the filesystem of the second operating system may not be saved in persistent memory, and as such, may be populated into the random-access memory of the computing device on each boot. Because the file system of the second operating system is not saved in persistent memory, user accounts, passwords for the user accounts, and the like are loaded into the file system during each boot of the second operating system.

In operation, method 500 may further include loading (block 515) the administrator password into the file system of the second operating system. During booting, the second operating system may launch a login failsafe module that reads the administrative password from an administrative password file in the persistent memory and installs the password into the filesystem of the second operating system. As such, the administrative password that is accessible by the first operating system and the second operating system is the same. As discussed in detail above, changes to the administrative password made in either the first operating system or the second operating system will change the administrative password saved in the administrative password file in the persistent memory. Because both the first and second operating systems access the same administrator password file both operating systems are accessible using an administrative user account using the shared administrator password.

In operation, method 500 may further include failing (520) to boot the second operating system before a user account is loaded for the second operating system. During the boot process, a number of steps may occur during which the second operating system and/or other aspects of the computing device may not successfully complete. If completion of each step does not occur successfully, the second operating system may not be restored, or at least not fully restored, thereby preventing users from logging into the computing device. For example, if a user account and/or associated passwords for the second operating system and/or applications thereof is not loaded prior to an issue in the boot process occurring, the second operating system or the applications running on the second operating system may be inaccessible. Inaccessibility of the second operating system and/or applications running thereon may thereby result in a user lockout, preventing access to aspects of the computing device.

In operation, method 500 may further include accessing (block 525) the computing device through an administrator user account protected by the administrator password. In certain implementations when the second operating system fails to boot to completion, because the administrator password was loaded into the filesystem of the second operating system early in the boot process, the second operating system may still be accessible, thereby allowing access to the computing device. By providing access to the computing device through the administrator user account diagnostics may occur, thereby allowing the issue with the second operating system and/or aspects of the computing device to be corrected.

In certain implementations, the administrator user account may be the same as the user account, and as such, the administrator password may be used to access the user account. In still other implementations, the administrator password may be used to access any accounts and/or applications associated with the second operating system or the first operating system.

In certain implementations, the user account password may be periodically updated by either the first operating system or the second operating system. In such an implementation, the new user account password may be accessible by both the first operating system and the second operating system.

Figure 6:
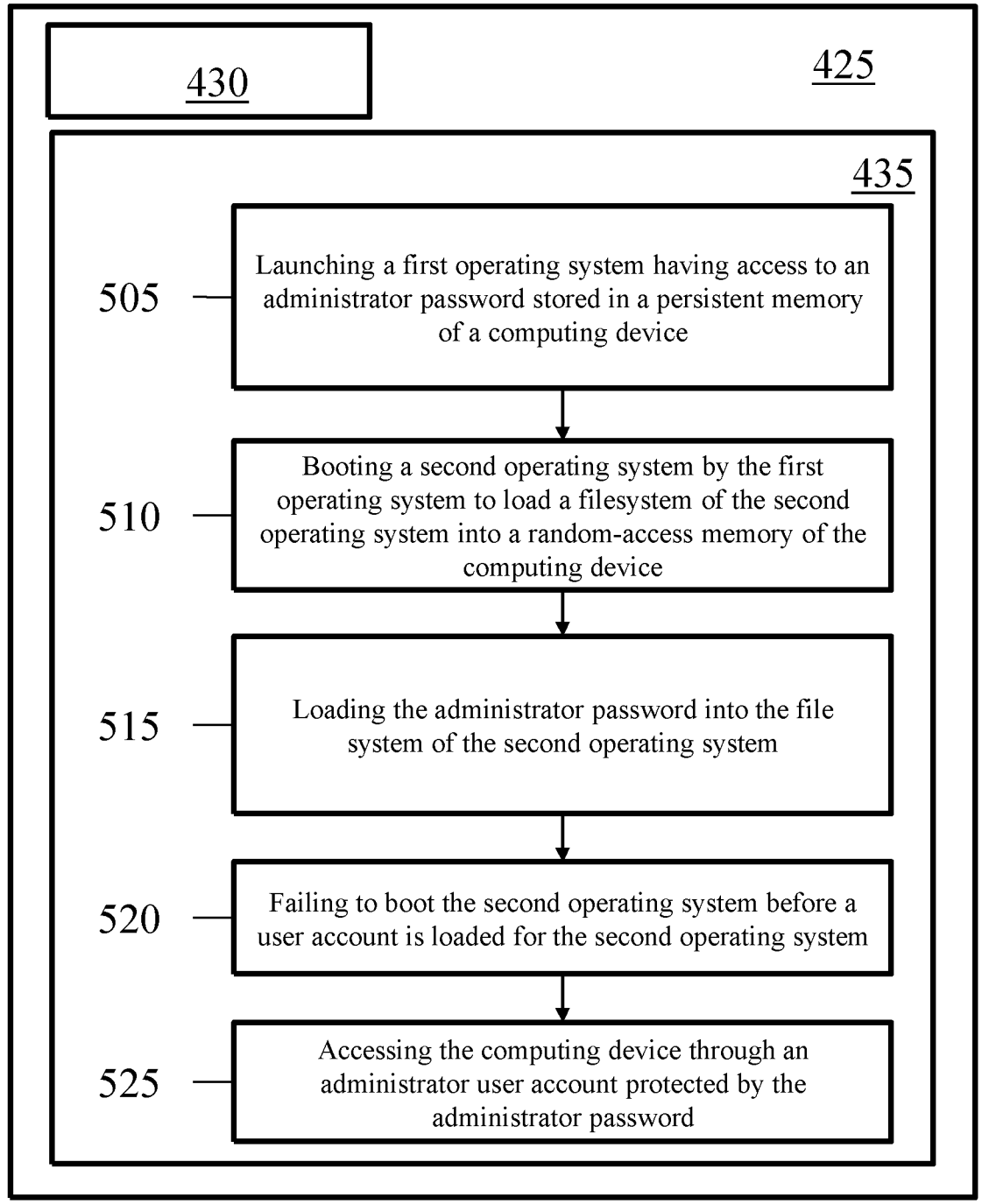
FIG. 6 is an example computing device with a hardware processor and accessible machine-readable instructions, according to one or more examples of the present disclosure.

Turning now to FIG. 6, an example computing device with a hardware processor and accessible machine-readable instructions is shown in accordance with one or more examples of the present disclosure. FIG. 6 provides the same structural components discussed above with respect to FIG. 4, and as such, for purposes of clarity, only the differences in the figures will be discussed herein. FIG. 6 provides is an example computing device 425, with a hardware processor 430, and accessible machine-readable instructions stored on a machine-readable medium 435 for managing data as discussed above with respect to one or more disclosed example implementations. FIG. 4 illustrates computing device 425 configured to perform the method disclosed in blocks 505, 510, 515, 520, and 525 and discussed in detail with respect to FIG. 5. However, computing device 425 may also be configured to perform other methods, techniques, functions, or processes described in this disclosure.

Figure 7:
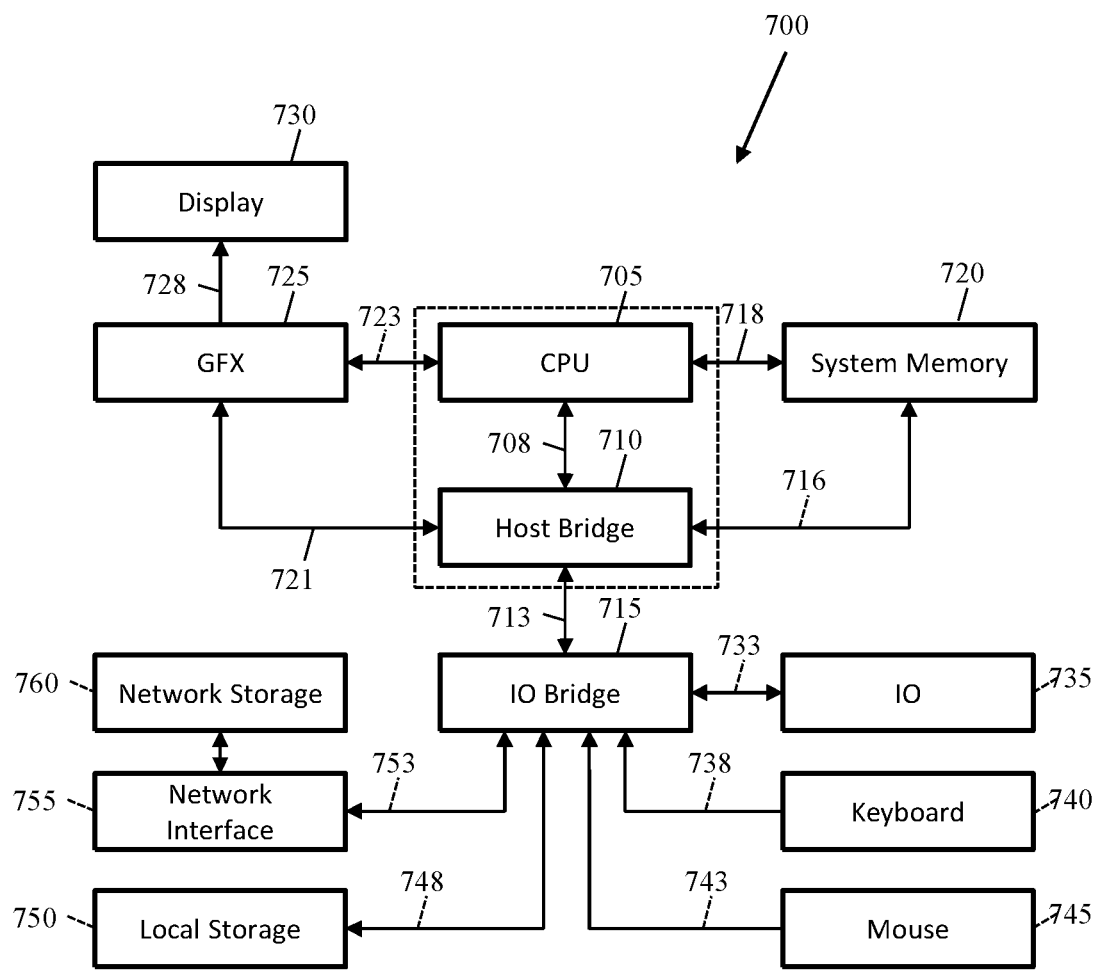
FIG. 7 is a schematic representation of a computer processing device that may be used to implement functions and methods, according to one or more examples of the present disclosure.

Referring now to FIG. 7, a schematic representation of a computer processing device 700 that may be used to implement functions and processes in accordance with one or more examples of the present disclosure is shown. FIG. 7 illustrates a computer processing device 700 that may be used to implement the systems, methods, and processes of this disclosure. For example, computing device 700 illustrated in FIG. 7 could represent a client device or a physical server device and include either hardware or virtual processor(s) depending on the level of abstraction of the computing device. In some instances (without abstraction), computing device 700 and its elements, as shown in FIG. 7, each relate to physical hardware. Alternatively, in some instances one, more, or all of the elements could be implemented using emulators or virtual machines as levels of abstraction. In any case, no matter how many levels of abstraction away from the physical hardware, computing device 700 at its lowest level may be implemented on physical hardware. In one implementation, computing device 700 may be a switch in accordance with the systems and methods described above.

FIG. 7 shows a computing device 700 in accordance with one or more examples of the present disclosure. Computing device 700 may be used to implement aspects of the present disclosure, such as an orchestrator, a gateway manager, a cloud monitor, a local storage, a cloud-based storage, or any other device that may be used implementing the systems and methods for managing data discussed herein. Computing device 700 may include one or more central processing units (singular "CPU" or plural "CPUs") 705 disposed on one or more printed circuit boards (not otherwise shown). Each of the one or more CPUs 705 may be a single-core processor (not independently illustrated) or a multi-core processor (not independently illustrated). Multi-core processors typically include a plurality of processor cores (not shown) disposed on the same physical die (not shown) or a plurality of processor cores (not shown) disposed on multiple die (not shown) that are collectively disposed within the same mechanical package (not shown). Computing system 700 may include one or more core logic devices such as, for example, host bridge 710 and input/output ("IO") bridge 715.

CPU 705 may include an interface 708 to host bridge 710, an interface 718 to system memory 720, and an interface 723 to one or more IO devices, such as, for example, graphics processing unit ("GFX") 725. GFX 725 may include one or more graphics processor cores (not independently shown) and an interface 728 to display 730. In certain embodiments, CPU 705 may integrate the functionality of GFX 725 and interface directly (not shown) with display 730. Host bridge 710 may include an interface 708 to CPU 705, an interface 713 to IO bridge 715, for embodiments where CPU 705 does not include interface 718 to system memory 720, an interface 716 to system memory 720, and for embodiments where CPU 705 does not include integrated GFX 725 or interface 723 to GFX 725, an interface 721 to GFX 725. One of ordinary skill in the art will recognize that CPU 705 and host bridge 710 may be integrated, in whole or in part, to reduce chip count, motherboard footprint, thermal design power, and power consumption. IO bridge 715 may include an interface 713 to host bridge 710, one or more interfaces 733 to one or more IO expansion devices 735, an interface 738 to keyboard 740, an interface 743 to mouse 745, an interface 748 to one or more local storage devices 750, and an interface 753 to one or more network interface devices 755.

Each local storage device 750 may be a solid-state memory device, a solid-state memory device array, a hard disk drive, a hard disk drive array, or any other non-transitory computer readable medium. Each network interface device 755 may provide one or more network interfaces including, for example, Ethernet, Fibre Channel, WiMAX, Wi-Fi, Bluetooth, or any other network protocol suitable to facilitate networked communications. Computing device 700 may include one or more network-attached storage devices 760 in addition to, or instead of, one or more local storage devices 750. Network-attached storage device 760 may be a solid-state memory device, a solid-state memory device array, a hard disk drive, a hard disk drive array, or any other non-transitory computer readable medium. Network-attached storage device 760 may or may not be collocated with computing device 700 and may be accessible to computing device 700 via one or more network interfaces provided by one or more network interface devices 755.

One of ordinary skill in the art will recognize that computing device 700 may include one or more application specific integrated circuits ("ASICs") that are configured to perform a certain function, such as, for example, hashing (not shown), in a more efficient manner. The one or more ASICs may interface directly with an interface of CPU 705, host bridge 760, or 10 bridge 715. Alternatively, an application-specific computing system (not shown), sometimes referred to as mining systems, may be reduced to only those components necessary to perform the desired function, such as hashing via one or more hashing ASICs, to reduce chip count, motherboard footprint, thermal design power, and power consumption. As such, one of ordinary skill in the art will recognize that the one or more CPUs 705, host bridge 710, 10 bridge 715, or ASICs or various sub-sets, super-sets, or combinations of functions or features thereof, may be integrated, in whole or in part, or distributed among various devices in a way that may vary based on an application, design, or form factor in accordance with one or more example embodiments. As such, the description of computing system 700 is merely exemplary and not intended to limit the type, kind, or configuration of components that constitute a computing system suitable for performing computing operations, including, but not limited to, hashing functions. Additionally, one of ordinary skill in the art will recognize that computing system 700, an application specific computing system (not shown), or combination thereof, may be disposed in a standalone, desktop, server, or rack mountable form factor.

One of ordinary skill in the art will recognize that computing system 700 may be a cloud-based server, a server, a workstation, a desktop, a laptop, a netbook, a tablet, a smartphone, a mobile device, and/or any other type of computing system in accordance with one or more example embodiments.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

While the present teachings have been described in conjunction with various examples, it is not intended that the present teachings be limited to such examples. The above-described examples may be implemented in any of numerous ways.

Also, the technology described herein may be embodied as a method, of which at least one example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

Advantages of one or more example embodiments may include one or more of the following:

In one or more examples, systems and methods disclosed herein may be used to access a computing device that has failed to boot an operating system to completion In one or more examples, systems and methods disclosed herein may be used to diagnose a computing system that has failed to boot an operating system to completion.

In one or more examples, systems and methods disclosed herein may be used to login to a computing device using a login failsafe module that is accessible even if the computing device does not boot an operating system to completion.

In one or more examples, systems and methods disclosed herein may be used to repair a problem in a computing device that prevented the computing device from booting an operating system to completion.

Not all embodiments will necessarily manifest all these advantages. To the extent that various embodiments may manifest one or more of these advantages, not all of them will do so to the same degree.

While the claimed subject matter has been described with respect to the above-noted embodiments, those skilled in the art, having the benefit of this disclosure, will recognize that other embodiments may be devised that are within the scope of claims below as illustrated by the example embodiments disclosed herein. Accordingly, the scope of the protection sought should be limited only by the appended claims.

What is claimed is:

1. A method for accessing a computing device, the method comprising:
    launching a first operating system having a bootloader to boot a second operating system into a random-access memory on the computing device, the first operating system and the second operating system having access to an administrator password contained in an administrator password file located in a persistent file of the computing device;
    booting the second operating system from the first operating system bootloader to populate a filesystem into the second operating system;
    executing a login failsafe by the second operating system to read the administrator password contained in the administrator password file located in the persistent file;
    installing the administrator password file in the filesystem of the second operating system by the login failsafe;
    failing to complete the booting of the second operating system; and
    allowing access to the computing device through an administrator user account protected by the administrator password when the second operating system fails to complete the booting.

2. The method of claim 1, wherein the filesystem of the second operating system is non-persistent.

3. The method of claim 1, further comprising monitoring for a change to the administrator password in at least one of the first operating system and the second operating system.

4. The method of claim 3, further comprising updating the administrator password in the administrator password file in the persistent file when the change occurs.

5. The method of claim 1, further comprising diagnosing a problem with the computing device that resulted in the failing to boot the second operating system on the computing device.

6. The method of claim 5, further comprising remediating the problem with the computing device that resulted in the failing to boot the second operating system on the computing device.

7. The method of claim 1, further comprising sharing the administrator password file between the first operating system and the second operating system.

8. The method of claim 1, further comprising changing the administrator password in the persistent file by the second operating system when a user updates a startup configuration and not updating the administrator password in the persistent file by the second operating system when a user does not update the startup configuration.

9. A computing device comprising:
    a persistent memory having an administrator password file including an administrator password;
    a random-access memory; and
    a processing resource executing instructions to:
    launch a first operating system having a bootloader to boot a second operating system into the random-access memory on the computing device, the first operating system and the second operating system having access to the administrator password file;
    boot the second operating system from the first operating system bootloader to populate a filesystem for the second operating system into the random-access memory;
    execute a login failsafe by the second operating system to read the administrator password contained in the administrator password file;
    install the administrator password file in the filesystem of the second operating system by the login failsafe;
    allow access to the computing device through an administrator user account protected by the administrator password when the second operating system fails to complete booting.

10. The computing device of claim 9, further comprising updating the administrator password by the second operating system when a user updates a startup configuration and not updating the administrator password in the persistent file by the second operating system when a user does not update the startup configuration.

11. The computing device of claim 9, further comprising executing instructions in the memory to share access to the administrator password between the first operating system and the second operating system.

12. The computing device of claim 9, further comprising executing instructions by the second operating system to force a login screen to appear on the computing device.

13. The computing device of claim 9, further comprising executing instructions to restore a user configuration.

14. The computing device of claim 9, wherein the computing device comprises a switch.

15. A non-transitory computer readable medium comprising computer executable instructions stored thereon that, when executed by one or more processing units cause the one or more processing units to:
launch a first operating system having a bootloader to boot a second operating system into a random-access memory on the computing device, the first operating system and the second operating system having access to an administrator password contained in an administrator password file located in a persistent file of the computing device;
boot the second operating system from the first operating system bootloader to populate a filesystem into the second operating system;
read the administrator password from the administrator password file located in the persistent file by a login failsafe utility of the second operating system;
install the administrator file in a file system of the second operating system;
log into an administrator account on the computing device using the administrator password when the computing device fails to complete a boot process.

16. The non-transitory computer readable medium of claim 15, further comprising instructions stored thereon that, when executed by the one or more processing units cause the one or more processing units to access information in the computing device that caused the computing device not to boot to completion.

17. The non-transitory computer readable medium of claim 15, further comprising instructions stored thereon that, when executed by the one or more processing units cause the one or more processing units to update the administrator password by the second operating system when a user updates a startup configuration and not update the administrator password in the persistent file by the second operating system when a user does not update the startup configuration.

18. The non-transitory computer readable medium of claim 15, further comprising instructions stored thereon that, when executed by the one or more processing units cause the one or more processing units to repair a problem that caused the second operating system not to boot to completion.

19. The non-transitory computer readable medium of claim 15, further comprising instructions stored thereon that, when executed by the one or more processing units cause the one or more processing units to update the user account password stored in the login failsafe module.

20. The non-transitory computer readable medium of claim 15, further comprising instructions stored thereon that, when executed by the one or more processing units cause the one or more processing units to set the administrator password to a default when the administrator password is not found during the boot of the second operating system.

* * * * *